US012087531B2

(12) United States Patent
Jeong et al.

(10) Patent No.: US 12,087,531 B2
(45) Date of Patent: Sep. 10, 2024

(54) HIGH-DURABILITY ELECTRICAL CONTACT STRUCTURE

(71) Applicants: Hyundai Motor Company, Seoul (KR); Kia Corporation, Seoul (KR)

(72) Inventors: Min-Gun Jeong, Seoul (KR); Hae-Won Jeong, Gwangmyeong-si (KR); Jee-Jung Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/212,576

(22) Filed: Jun. 21, 2023

(65) Prior Publication Data

US 2023/0343535 A1 Oct. 26, 2023

Related U.S. Application Data

(62) Division of application No. 17/478,557, filed on Sep. 17, 2021, now abandoned.

(30) Foreign Application Priority Data

Jun. 1, 2021 (KR) ........................ 10-2021-0070954

(51) Int. Cl.
*H01H 50/54* (2006.01)
*H01H 50/16* (2006.01)

(52) U.S. Cl.
CPC ............ *H01H 50/54* (2013.01); *H01H 50/16* (2013.01)

(58) Field of Classification Search
None
See application file for complete search history.

(56) References Cited

U.S. PATENT DOCUMENTS 3,082,307 A * 3/1963 Greenwood ......... H01H 33/664 218/123
8,274,007 B2 * 9/2012 Blalock ................ H01H 33/182 218/129
8,410,878 B1 * 4/2013 Takaya ..................... H01H 1/00 335/201
8,653,917 B2 * 2/2014 Takaya ................ H01H 50/546 335/131
10,490,376 B2 * 11/2019 Kuroda .................. H01H 1/021
2010/0044345 A1 * 2/2010 Oberg .................... H01H 1/021 29/622
2013/0063232 A1 3/2013 Takaya et al.
2019/0295796 A1 * 9/2019 Sugisawa ............. H01H 1/2083

FOREIGN PATENT DOCUMENTS

KR 2002-0086442 A 11/2002
KR 10-1451536 B1 10/2014

* cited by examiner

*Primary Examiner* — Bernard Rojas
(74) *Attorney, Agent, or Firm* — MORGAN, LEWIS & BOCKIUS LLP

(57) ABSTRACT

A high-durability electrical contact structure may include a first contact and a second contact disposed to face each other while being spaced apart a predetermined distance from each other. A portion of the second contact includes a magnetic material. Damage to the surfaces of an arcing electrical contact according to arc generation positions between contacts is minimized, increasing the life of the arcing electrical contact.

8 Claims, 14 Drawing Sheets

HIGH-DURABILITY ELECTRICAL CONTACT STRUCTURE

CROSS-REFERENCE TO RELATED APPLICATION

The present application is a Divisional of U.S. patent application Ser. No. 17/478,557, filed Sep. 17, 2021, which claims priority to Korean Patent Application No. 10-2021-0070954, filed on Jun. 1, 2021, the entire contents of which is incorporated herein for all purposes by this reference.

BACKGROUND OF THE INVENTION

Field of the Invention

The present invention relates to an electrical contact used in an arcing switch for driving a plurality of electrical components of a vehicle.

Description of Related Art

Electrical contacts are essential elements of an electrical circuit, and the reliability of the electrical contacts is essential for normal operation of the electrical circuit. A variety of electrical contact structures are used to drive a plurality of electrical components of a vehicle.

Among such a variety of electrical contact structures, an electrical contact of an arcing switch that turns on/off a current by moving a contact in a direction perpendicular to the contact surface is configured such that a first contact 11 and a second contact 12 are disposed to face each other as illustrated in FIG. 1. When a DC current flows through contacting portions as illustrated in FIG. 2, an arc is generated so that metal particles move in a predetermined direction, forming protrusions P1 and P2 as illustrated in FIG. 3. The protrusions P1 and P2 may cause local melting on and damage to the surfaces of the contacts, thereby serving as a major cause of failure in the relay arcing switch.

As a related-art solution for overcoming the present problem, a contact switch as illustrated in FIG. 4 and FIG. 5 is present.

As illustrated in FIG. 4 and FIG. 5, in the present structure, fixed contacts 21 are disposed to face moving contacts 22, and permanent magnets 23 are disposed on both sides of contacting portions. Consequently, the present structure is directed to induce the diffraction of arcs using transverse force F generated by a magnetic field B of the permanent magnet 23.

However, the present related-art structure necessarily has the increased actual distances between the contacting portions and the magnets, and thus, the effects thereof are insignificant compared to those of other structures having expensive magnet specification.

Furthermore, since a magnet separated from a conduction channel must be used, an insulating structure, such as a ceramic chamber 24, is required to be disposed between the magnets and the contacts, and a separate structure for holding the magnets at predetermined distances from the contacts is required. Thus, there is a drawback in that the size of the entire system is significantly increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a high-durability electrical contact structure intended to minimize damage to the surfaces of arcing contacts according to arc generation positions between the contacts, thereby increasing the life of the arcing contacts.

In one aspect, various aspects of the present invention provide a high-durability electrical contact structure including: a first contact and a second contact disposed to face each other while being spaced apart a predetermined distance from each other. A portion of the second contact may include a magnetic material.

The second contact may include a second rivet portion forming a body of the second contact and a second contact portion provided on an end portion of the second rivet portion to face the first contact, and the magnetic material is included in the second rivet portion of the second contact.

The magnetic material of the second rivet portion may be a ferromagnetic material or a magnetized alloy including the ferromagnetic material.

The second rivet portion may include a plating made from one or more selected from among Ag, Cu, Sn, and Ni.

The central axis of the first contact and the central axis of the second contact may be disposed concentrically.

The magnetic material may be a magnetic core fused inside the second rivet portion and disposed coaxially with a central axis of the second rivet portion of the second contact.

The magnetic material may be a magnetic core disposed in the second rivet portion to be eccentric from a central axis of the second rivet portion in an axial direction of the second rivet portion in parallel to the central axis of the second rivet portion of the second contact.

The second contact may include a top recess opening at a center portion of a top surface of the second contact portion, and the magnetic material may be a magnetic core inserted into the top recess and disposed coaxially with a central axis of the second rivet portion of the second contact.

The second contact may include a bottom recess opening a center portion of a bottom surface of the second contact portion, and the magnetic material may be a magnetic core inserted into the bottom recess and disposed coaxially with a central axis of the second rivet portion of the second contact.

The magnetic material may be a magnetic core inserted and disposed between the second rivet portion and the second contact portion.

A contact surface of the second contact portion may not be parallel to a contact surface of the first contact.

The central axis of the first contact may not be parallel to the central axis of the second contact.

The central axis of the first contact and the central axis of the second contact may be disposed coaxially, and the contact surface of the second contact portion may be inclined with respect to a surface parallel to the contact surface of the first contact portion.

In another aspect, also provided is a high-durability electrical contact structure including: a first contact and a second contact disposed to face each other while being spaced apart a predetermined distance from each other; and an external magnetic material surrounding the second contact.

The second contact includes a second rivet portion forming a body of the second contact, with a second head having a decreased diameter being provided on one end portion of the second rivet portion, and a second contact portion provided on an end portion of the second head to face the first contact. The high-durability electrical contact structure may further include a lead tab coupled to a side surface of the second rivet portion of the second contact. The external magnetic material may be disposed between the lead tab and the second head.

The second contact may include a second rivet portion forming a body of the second contact and a second contact portion provided on an end portion of the second head to face the first contact. The high-durability electrical contact structure may further include a lead tab coupled to a side surface of the second rivet portion of the second contact. The external magnetic material may be disposed below the lead tab to surround the second rivet portion of the second contact.

The external magnetic material may be a lead tab coupled to a side surface of the second contact.

In another aspect, also provided is a high-durability electrical contact structure including: a first contact and a second contact disposed to face each other while being spaced apart a predetermined distance from each other; and a solenoid disposed adjacent to the first contact and the second contact to generate magnetic force between a contact surface of the first contact and a contact surface of the second contact.

The solenoid may include a pair of coils, winding axes of which are disposed in parallel to each other.

The solenoid may include a pair of coils, winding axes of which are disposed side by side in a predetermined direction thereof.

The high-durability electrical contact structure according to various exemplary embodiments of the present invention may induce the diffraction of an arc generating between contacts, reducing damage to the surfaces of the contacts and the formation of protrusions that would be caused by an arc.

Furthermore, the high-durability electrical contact structure according to various exemplary embodiments of the present invention may reduce an increase in the temperature of the contacting portions and the fusion of the contacting portions that would be caused by the arc.

Furthermore, the high-durability electrical contact structure according to various exemplary embodiments of the present invention may reduce the carbonization of organic materials that would be caused by an arc generated in the contacting portions and impair conduction.

Furthermore, in the high-durability electrical contact structure according to various exemplary embodiments of the present invention, even in the case that the endurance life of the electrical contact may be increased and the performance of the electrical contacts may be improved, significant portions of the existing structure and the existing fabrication process may be maintained without changes.

Furthermore, the high-durability electrical contact structure according to various exemplary embodiments of the present invention may use a low-specification electrical contact structure in a strong-current environment differently from the related art, reducing cost.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
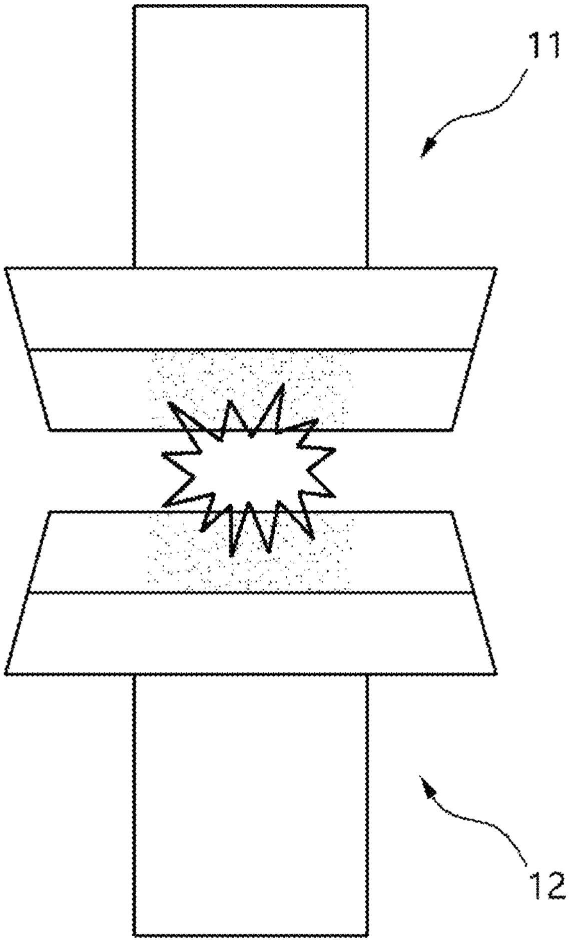
FIG.1 (Prior Art)
FIG. 1, FIG. 2, FIG. 3, FIG. 4, and FIG. 5 illustrate electrical contact structures of the related art and problems thereof.
Figure 2:
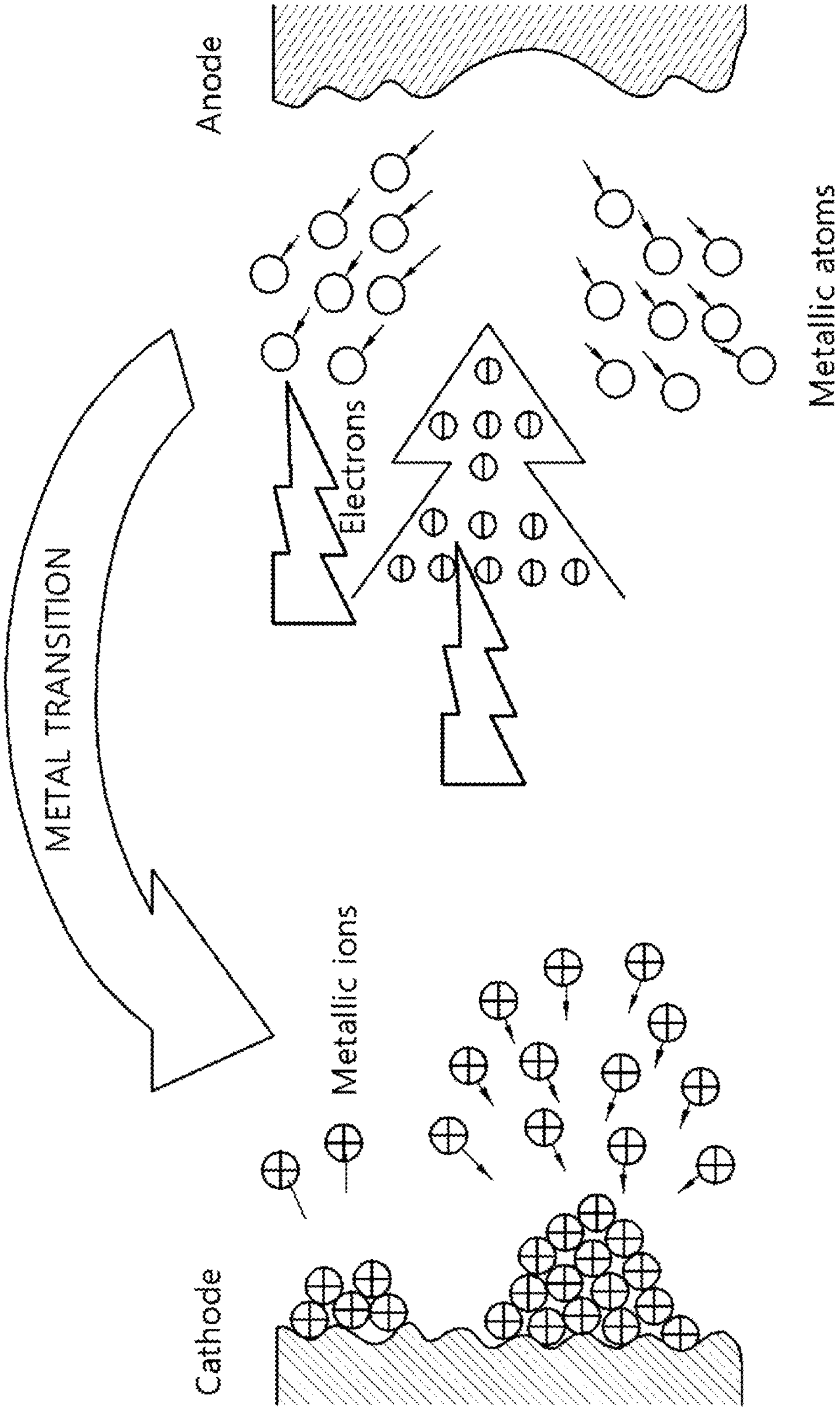
FIG.2 (Prior Art)
Figure 3:
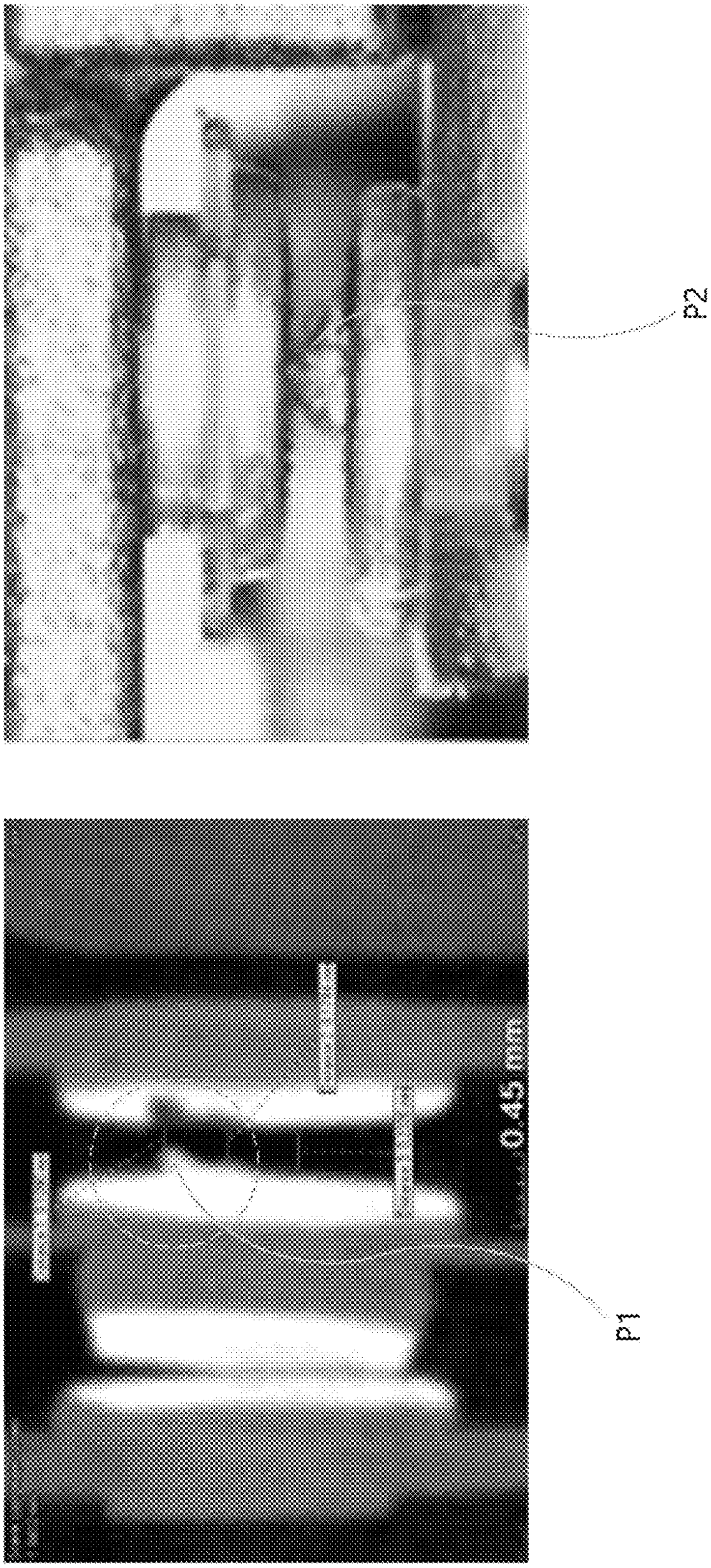
FIG.3 (Prior Art)
Figure 4:
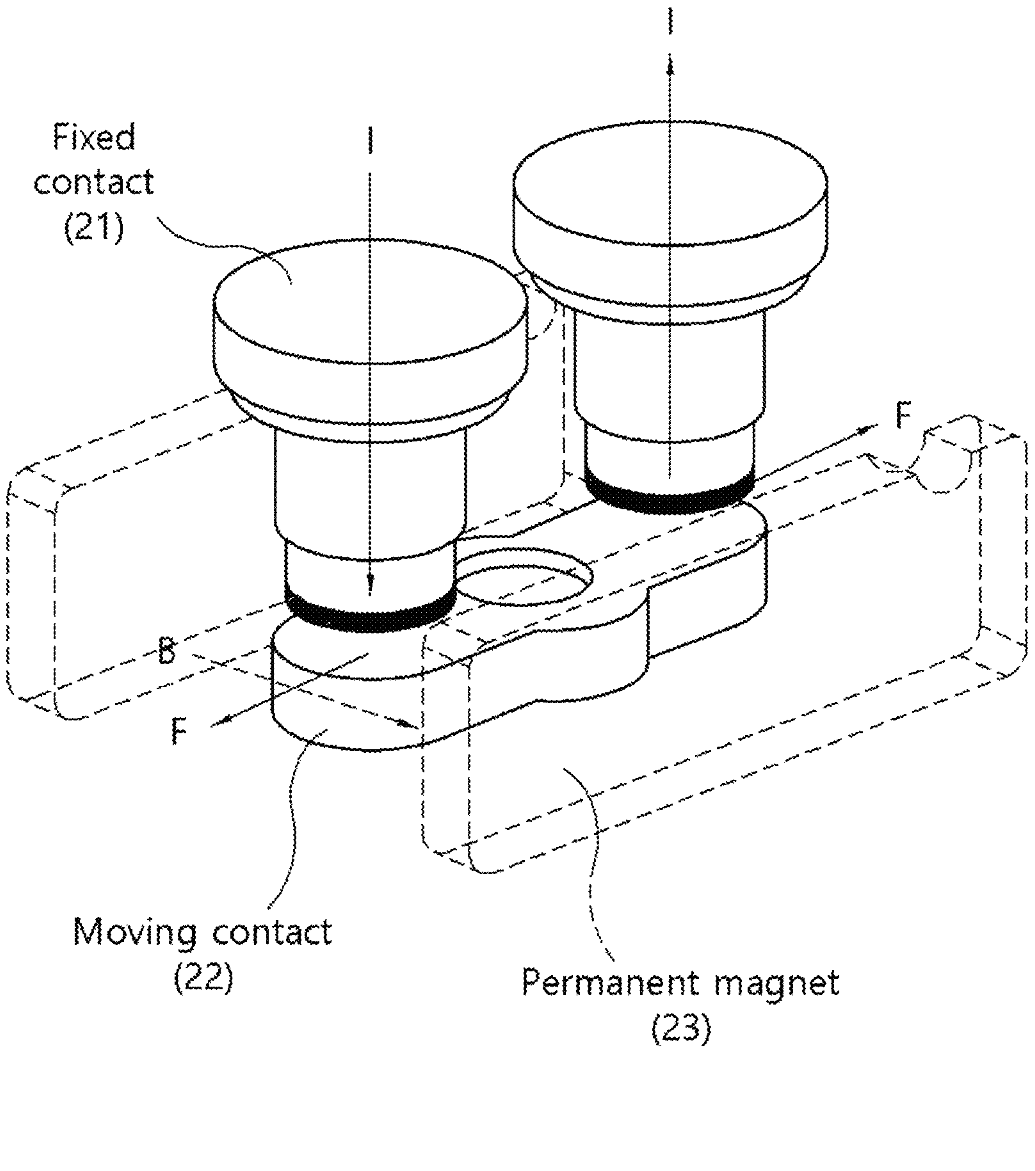
FIG.4 (Prior Art)
Figure 5:
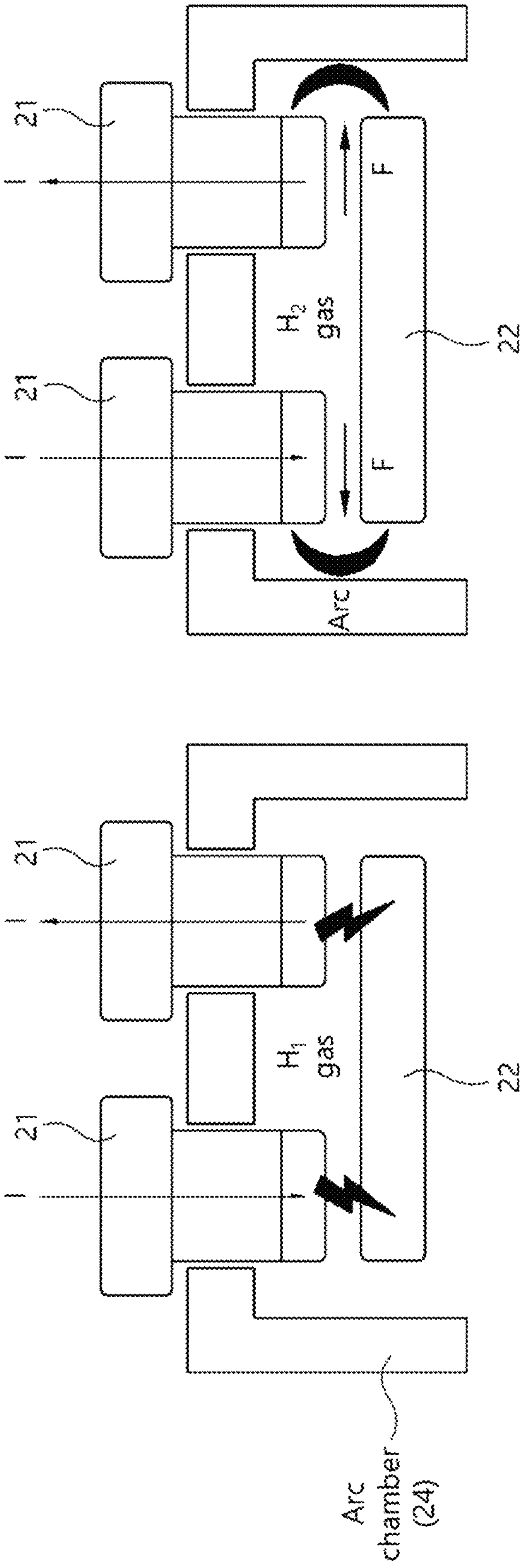
FIG.5 (Prior Art)

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the detailed description of the present invention, explanations of known technology or repetitive descriptions may be reduced or omitted in the case that the gist of the present invention may be unnecessarily obscured thereby.

Figure 6:
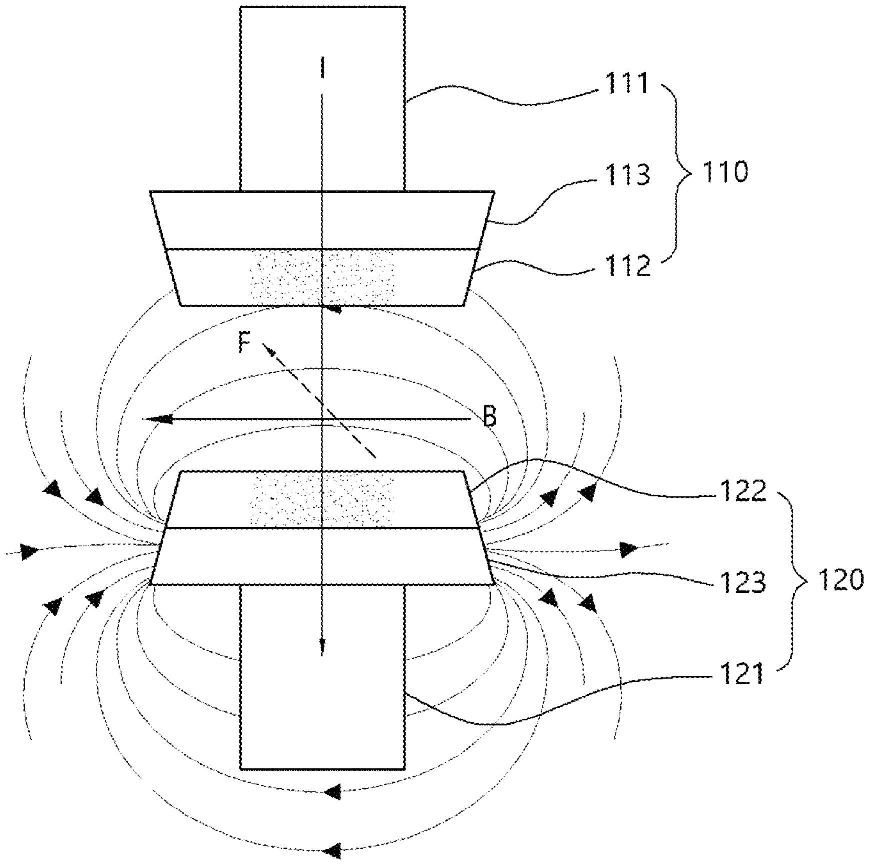
FIG. 6 illustrates an electrical contact structure according to various exemplary embodiments of the present invention.
Figure 7A:
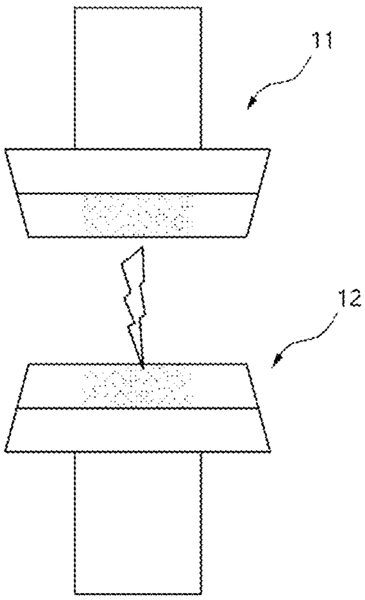
FIG. 7A illustrates the generation of an arc according to the related art.
Figure 7B:
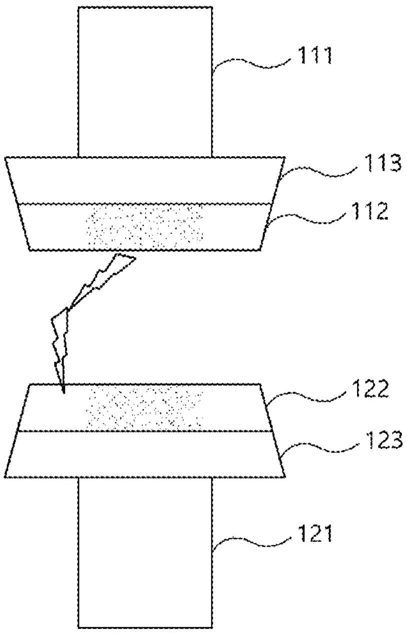
FIG. 7B illustrates the generation of an arc by the electrical contact structure illustrated in FIG. 6.

FIG. 6 illustrates an electrical contact structure according to various exemplary embodiments of the present invention, FIG. 7A illustrates the generation of an arc according to the related art, and FIG. 7B illustrates the generation of an arc by the electrical contact structure illustrated in FIG. 6.

Hereinafter, the high-durability electrical contact structure according to the various exemplary embodiments of the present invention will be described with reference to FIGS. 6, 7A, and 7B.

The high-durability electrical contact structure according to various exemplary embodiments of the present invention is a contact structure of an arcing switch that turns on/off a current by moving a contact in a direction perpendicular to the contact surface, and is directed to induce the diffraction of an arc generated between contacts by magnetic force, reducing surface damages in the electrical contact.

To realize the present objective, there are specific factors to be considered.

First, a magnet may be located as close as possible to the electrical contact to maximize an effect of magnetic force. Since the electrical contact and the magnet are disposed as close as possible, the use of an effect of magnetic force may be maximized. A circuit fabricated by magnetizing a typical steel material for lead frames or a ferromagnetic metal material may be used, in addition to existing permanent magnets showing strong magnetic force.

Furthermore, in a case in which the magnetic material is directly attached to the contacts or is formed as a lead frame for close approach, a circuit is actually formed and electrical conduction is enabled. It is also necessary to compensate for low electrical conductivity of the magnetic material. In the instant case, the low electrical conductivity of the magnetic material may be compensated for by plating the surface of the magnetic material with a high-conductivity material. Examples of the material which may be plated include tin (Sn), nickel (Ni), gold (Au), silver (Ag), copper (Cu), and the like.

Furthermore, the magnetic material has a Curie temperature above which the magnetic material loses magnetic properties. Thus, the electrical contact may be designed so as not to have a high temperature. When the material showing strong magnetic force is disposed outside the electrical contact, not only the contacts but also the surrounding structures and components may be influenced.

When the magnetic material is disposed around contacting portions of the electrical contact, abraded magnetic particles may be attached to the electrical contact or other components, causing a defect. Thus, the magnetic material is not used on contact portions.

Furthermore, riveting is generally used in the fabrication of the arching electrical contact, and in the instant case, deformation is formed by strong pressure. Thus, it is appropriate to reduce the use of the magnetic material in positions in which deformation occurs.

Next, it is effective that the direction of magnetic field lines of the magnetic material is as perpendicular as possible to the direction of the arc.

This is because an effect of changing the trajectory of the arc is not obtained when the direction of magnetic field lines is the same as the direction of the arc.

Furthermore, the shape and size of the magnetic material may be limited according to the structure of the electric contacts and the surrounding structures. In the instant case, it may be difficult to design the direction of a magnetic field as intended.

To overcome these problems, it may be considered that the contacting portions of the electrical contact or the magnets are disposed in eccentric positions.

Furthermore, it may be considered that, when both the opposing contacts are magnetized, the direction of magnetic field lines is the same as the direction of the arc, and thus, the effect of changing the trajectory of the arc is not obtained and the two contacts are subjected to attractive force and repulsive force.

The high-durability electrical contact structure according to the various exemplary embodiments of the present invention made in consideration of the above-described features includes a first contact 110 and a second contact 120.

The first contact 110 includes a first rivet portion 111 forming a body, with one end portion thereof being coupled to a board or a plate of an electrical circuit, and a first contact portion 112 provided on the other end portion of the first rivet portion 111. The first rivet portion 111 includes a first head 113 having an increased diameter on one end portion of a cylindrical or polygonal column, and the first contact portion 112 is provided on the first head 113.

The second contact 120 includes a second rivet portion 121 forming a body, with one end portion thereof being coupled to a board or a plate of an electrical circuit, and a second contact portion 122 provided on the other end portion of the second rivet portion 121. The second rivet portion 121 includes a second head 123 having an increased diameter on one end portion of a cylindrical or polygonal column, and the second contact portion 122 is provided on the second head 123. The first contact portion 112 and the second contact portion 122 are disposed to face each other while being spaced apart a predetermined distance from each other.

The first rivet portion 111 may be made from a copper (Cu) material to which no magnetic material is applied, and the first contact portion 112 may be made from a silver (Ag) material. That is, the first rivet portion 111 may be made from a non-magnetic material, such as a paramagnetic material or a diamagnetic material, which is too weakly influenced by a magnetic field to be magnetized, except for the ferromagnetic material.

Furthermore, the second rivet portion 121 is made from a magnetic material to generate the Lorentz force in a space between the first contact portion 112 and the second contact portion 122, as illustrated in the figures.

The second rivet portion 121 is made by magnetizing one selected from among ferromagnetic materials, such as iron (Fe), nickel (Ni), cobalt (Co), and neodymium (Nd), dysprosium (Dy), and alloys thereof.

Although ferromagnetic materials having low electrical conductivity may be unsuitable to be used in a strong current environment, the second rivet portion 121 may be plated with Ag, Cu, Sn, Ni, or the like to improve the conduction performance thereof.

Since the high-durability electrical contact structure according to the various exemplary embodiments of the present invention has the above-described configuration, an arc that has occurred, as illustrated in FIG. 7A, may be diffracted as illustrated in FIG. 7B, so that the trajectory of the arc may be changed toward the external periphery of the contact portions.

That is, as illustrated in FIG. 6, the direction I of movement of ions caused by the arc is the direction of a straight line from the first contact portion 112 to the second contact portion 122, and the direction of a magnetic field B is not in parallel to and at a predetermined angle with respect to the direction I.

Thus, magnetic force F is generated in a direction perpendicular to I and B, so that the direction of the arc is biased outward due to an effect of the magnetic force.

The direction of the magnetic force formed to be perpendicular to the direction of a current may be most ideal for the diffraction of the arc.

Due to the diffraction of the arc, the trajectory of the arc is increased, and a portion of the contact portion to be damaged is dispersed. That is, the energy of the arc is reduced, and the centralization of the arc to a specific portion is prevented or reduced.

Figure 8:
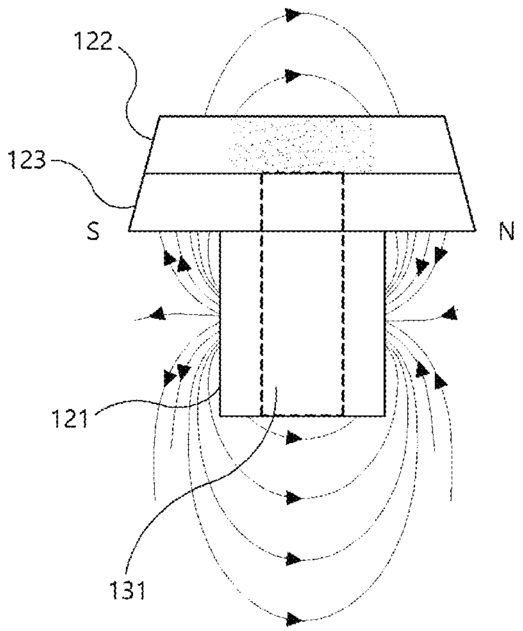
FIG. 8 illustrates an electrical contact structure according to various exemplary embodiments of the present invention.

Next, FIG. 8 illustrates an electrical contact structure according to various exemplary embodiments of the present invention, and FIG. 9, FIG. 10, FIG. 11 and FIG. 12 illustrate applications of the electrical contact structure according to the various exemplary embodiments of the present invention.

Hereinafter, electrical contact structures according to the various exemplary embodiments and the applications of the present invention will be described with reference to FIGS. 8 to 12, except for some components and functions the same as those of the foregoing embodiment.

The electrical contact structure according to the various exemplary embodiments of the present invention also includes the first contact 110 and the second contact 120, in which the first contact 110 includes the first rivet portion 111 and the first contact portion 112, and the second contact 120 includes the second rivet portion 121 and the second contact portion 122.

The first rivet portion 111 and the second rivet portion 121 may be made from a Cu material, while the first contact portion 112 and the second contact portion 122 may be made from a Ag material.

While the foregoing various exemplary embodiments are configured such that the entirety of the second rivet portion 121 of the second contact 120 is magnetized, the electrical contact structure according to the various exemplary embodiments are configured such that neither the first rivet portion 111 nor the second rivet portion 121 is magnetized. That is, the first rivet portion 111 and the second rivet portion 121 may be made from a non-magnetic material, such as a paramagnetic material or a diamagnetic material, which is too weakly influenced by a magnetic field to be magnetized, except for the ferromagnetic material.

Instead, the various exemplary embodiments are characterized in that a magnetic core 131 showing strong magnetic force is inserted into the second contact 120.

That is, as illustrated in FIG. 8, the magnetic core 131 is inserted into or disposed in the second rivet portion 121 such that the central axis of the magnetic core 131 is coaxial with the central axis of the second rivet portion 121 and both end portions of the magnetic core 131 coincide with both end portions of the second rivet portion 121.

The insertion of the magnetic core 131 into the second rivet portion 121 is realized by cladding technology. That is, the magnetic core 131 is fused to the metal of the second rivet portion 121 by the cladding technology.

This arrangement of the magnetic core 131 may generate magnetic force in a direction at a predetermined angle with respect to the direction of the arc, changing the trajectory of the arc.

Figure 9:
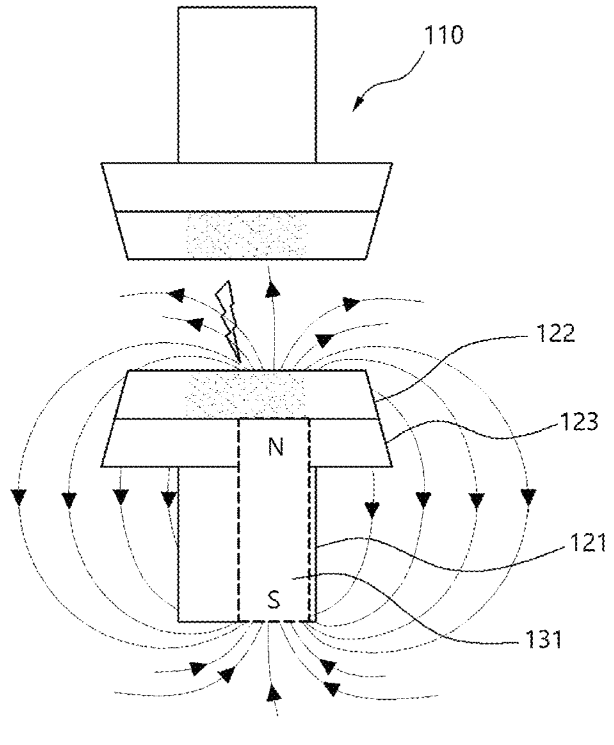
FIG. 9, FIG. 10, FIG. 11 and FIG. 12 illustrate applications of the electrical contact structure according to the various exemplary embodiments of the present invention.

Furthermore, as illustrated in FIG. 9, the magnetic core 131 may be inserted into or disposed in the second rivet portion 121 to be eccentric to the central axis of the second rivet portion 121 in an axial direction parallel to the central axis of the second rivet portion 121. In the instant case, magnetic field lines may be formed to be normal to the direction of the arc, so that the arc may be influenced by an electromagnetic force.

Figure 10:
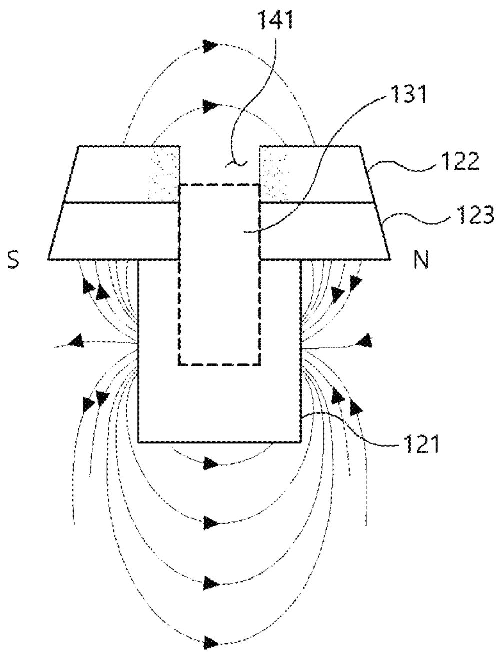
Figure 11:
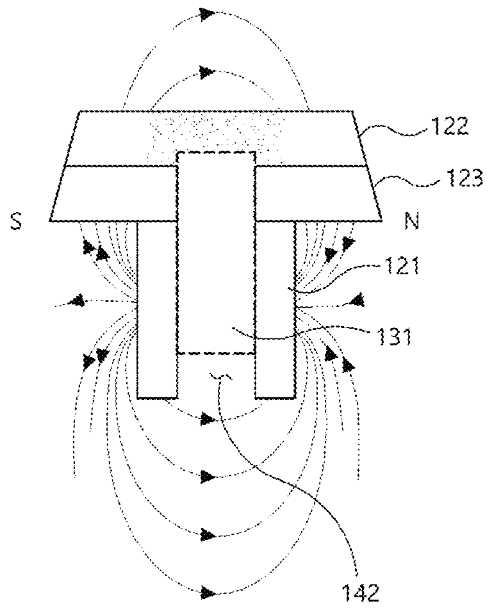

Furthermore, as illustrated in FIG. 10 and FIG. 11, the magnetic core 131 may be disposed in a recess indented toward the central axis of the second contact 120.

That is, as illustrated in FIG. 10, a top recess 141 opening the center portion of the top surface of the second contact 120 may be machined, and the magnetic core 131 may be inserted into the machined top recess 141.

Furthermore, as illustrated in FIG. 11, a bottom recess 142 opening the center portion of the bottom surface of the second contact 120 may be machined, and the magnetic core 131 may be inserted into the machined bottom recess 142. Here, the bottom recess 142 may extend to the second contact portion 122.

Figure 12:
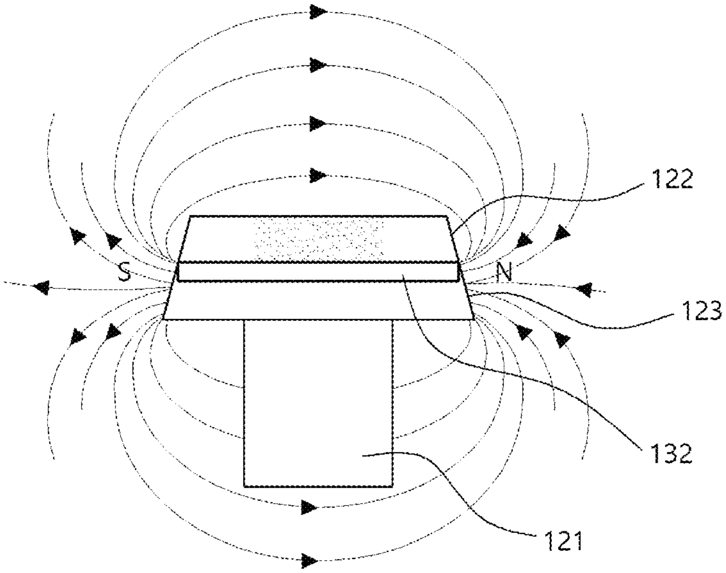

Furthermore, as illustrated in FIG. 12, the magnetic core 132 may be inserted between the second rivet portion 121 and the second contact portion 122 in a direction parallel to the top surface of the second rivet portion 121 or the second head 123 and then be fixed in position by welding. Here, since a typical ferromagnetic material has a high melting point, the magnetic core 132 having the form of a mixture may be inserted into the second rivet portion 121 or the second head 123.

Although the electrical contact structure according to the various exemplary embodiments as described above requires an additional machining process, it is more preferable than a situation in which a strong current is used, since a material showing strong magnetic force may be used.

Figure 13:
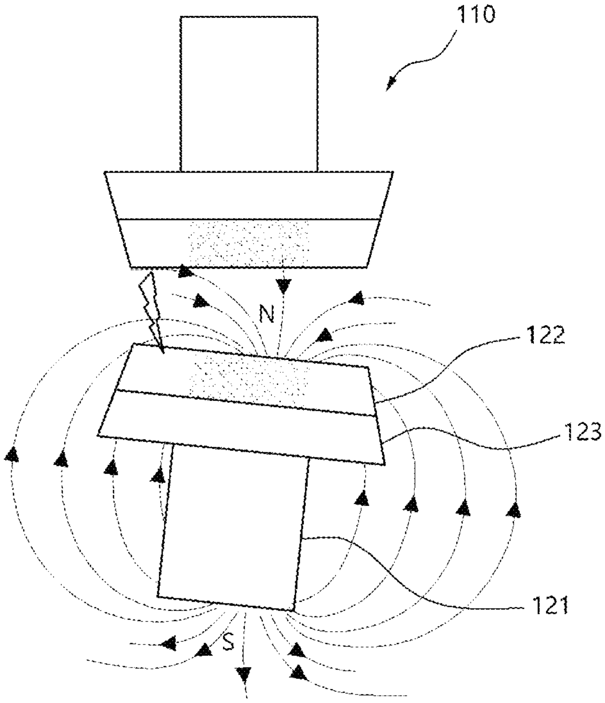
FIG. 13 and FIG. 14 illustrate applications of the various exemplary embodiments of the present invention.
Figure 14:
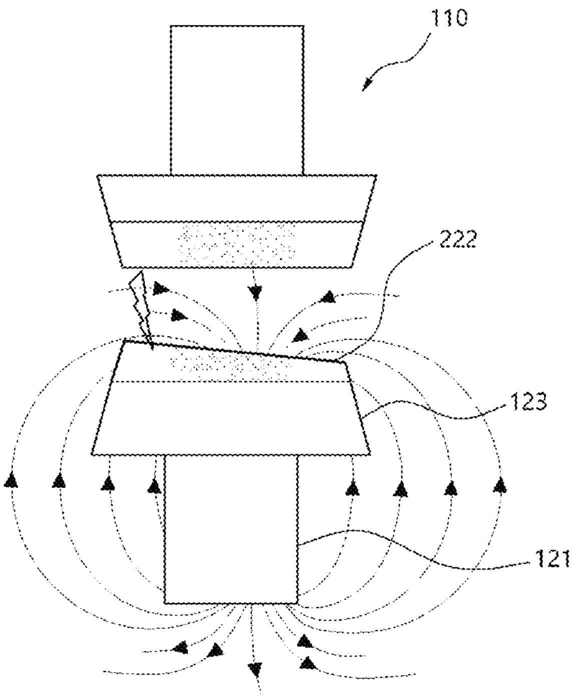

Next, FIG. 13 and FIG. 14 illustrate applications of the various exemplary embodiments of the present invention.

FIG. 13 and FIG. 14 illustrate arrangements in which the contact surface of the first contact portion 112 of the first contact 110 is not in parallel to the contact surface of the second contact portion 122 of the second contact 120. The case of FIG. 13 is an exemplary embodiment in which an angle of contact is changed such that the central axis of the second contact 120 does not coincide with the central axis of the first contact 110.

Furthermore, the case of FIG. 14 is a configuration in which the central axis of the second contact 120 coincides with the central axis of the first contact 110 but the contact surface 222 of the second contact portion 122 is not in parallel to the contact surface of the first contact portion 112.

In both applications, since the contact surfaces of the two contacts are not in parallel to each other, magnetic field lines may be generated in a form of lines normal to the direction of the arc, so that the arc may be influenced by electromagnetic force.

Figure 15:
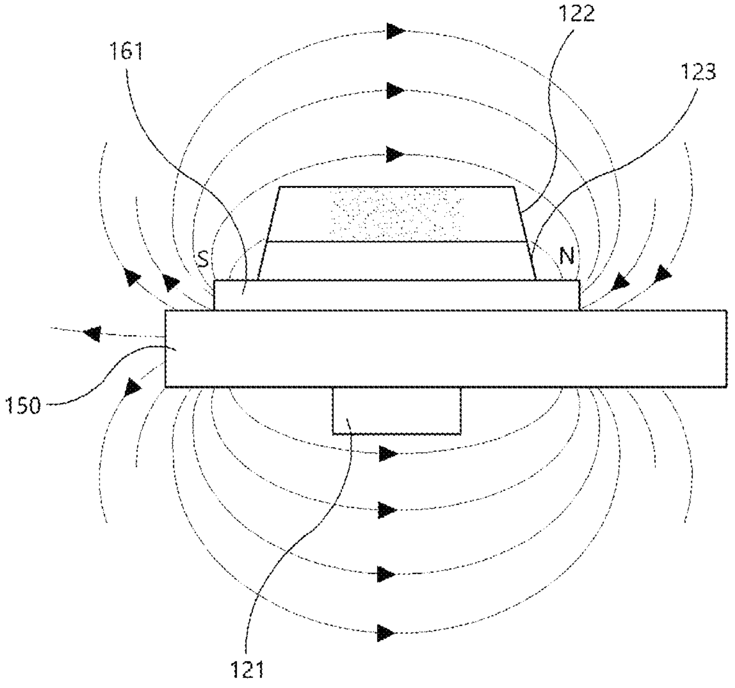
FIG. 15 illustrates an electrical contact structure according to various exemplary embodiments of the present invention.
Figure 16:
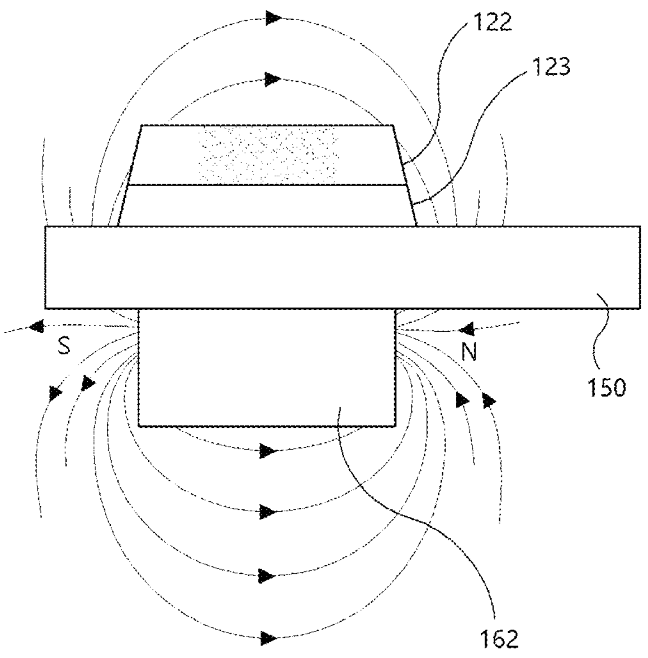
FIG. 16 and FIG. 17 illustrate applications of the electrical contact structure according to the various exemplary embodiments of the present invention.
Figure 17:
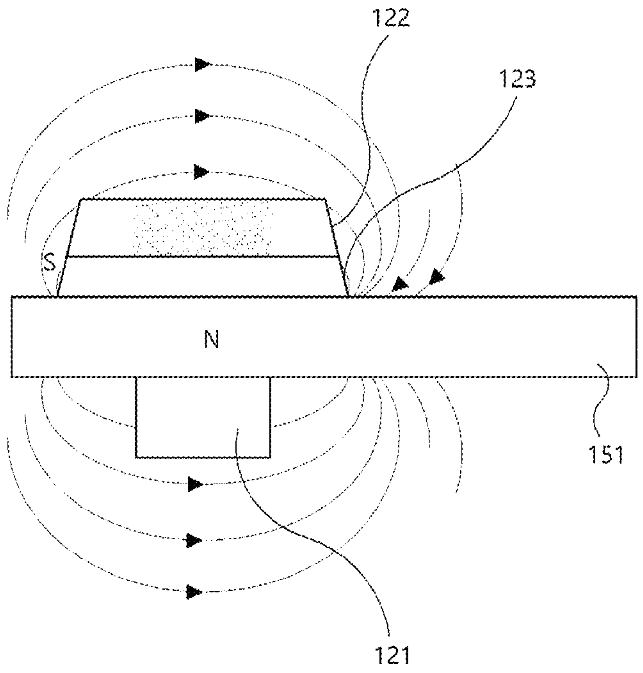

FIG. 15 illustrates an electrical contact structure according to various exemplary embodiments of the present invention, and FIG. 16 and FIG. 17 illustrate applications of the electrical contact structure according to the various exemplary embodiments of the present invention.

Each of the various exemplary embodiments and the application thereof illustrated in FIGS. 15 and 16 is a structure including an external magnetic material 161 or 162 outside the second contact 120.

That is, as illustrated in FIG. 15, the external magnetic material 161 may be disposed to surround the second rivet portion 121 of the second contact 120, may have the shape of a doughnut to surround and fix the second rivet portion 121, and may be formed by plating.

Furthermore, for connection of a wire, the external magnetic material 161 may be provided as a washer disposed between and coupled to a lead tab 150 connected to a side surface of the second rivet portion 121 and the second head 123.

Alternatively, as illustrated in FIG. 16, the external magnetic material 162 may be disposed below the lead tab 150 while surrounding the second rivet portion 121.

Furthermore, as illustrated in FIG. 17, the lead tab 151 mounted around the second rivet portion 121 or on a side surface of the second rivet portion 121 may be implemented as a magnetic material.

As illustrated in FIGS. 15 to 17, according to the electrical contact structures according to the various exemplary embodiments and the applications of the present invention, it is possible to change the direction of an arc without a change in the existing contacts by generating magnetic force at an angle of inclination with respect to the direction of the arc.

Figure 18:
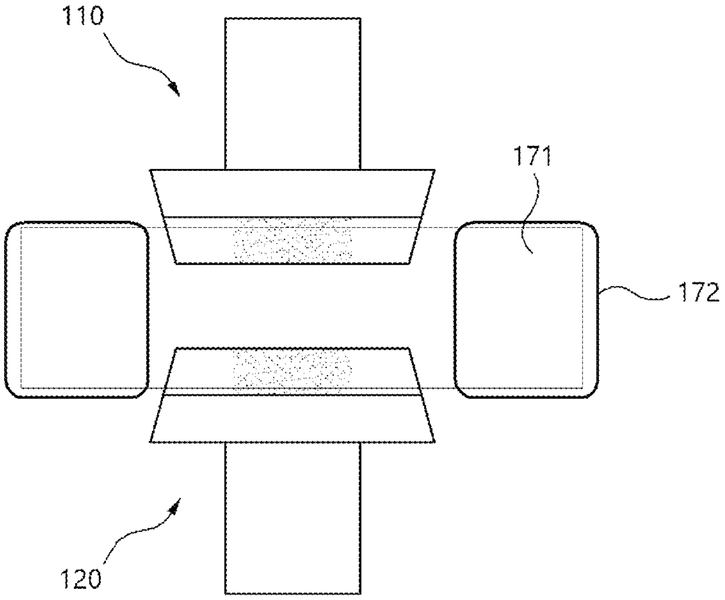
FIG. 18 and FIG. 19 illustrate an electrical contact structure according to various exemplary embodiments of the present invention.
Figure 19:
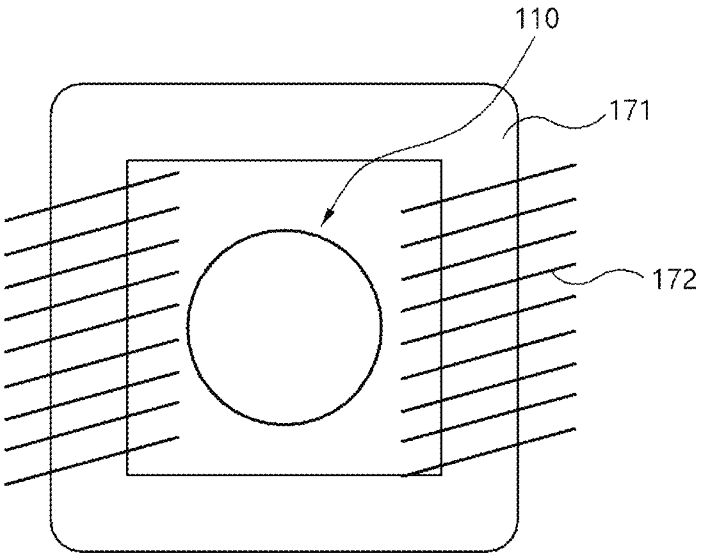
Figure 20:
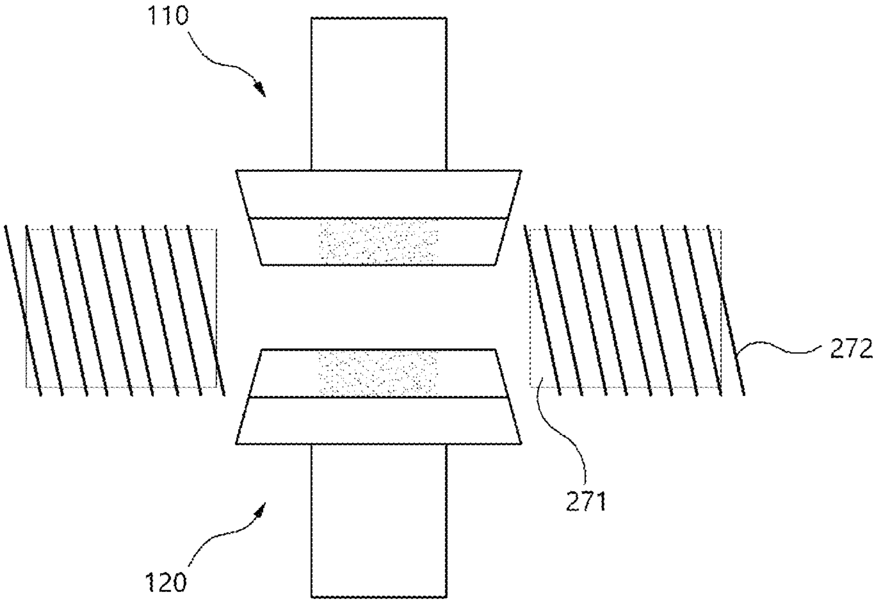
FIG. 20 and FIG. 21 illustrate applications of the electrical contact structure according to the various exemplary embodiments of the present invention.
Figure 21:
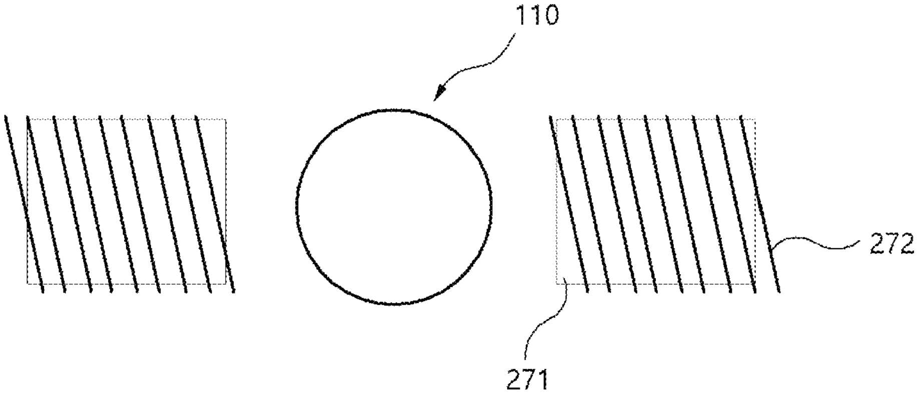

Finally, FIG. 18 and FIG. 19 illustrate an electrical contact structure according to various exemplary embodiments of the present invention, and FIG. 20 and FIG. 21 illustrate applications of the electrical contact structure according to the various exemplary embodiments of the present invention.

The electrical contact structure according to the various exemplary embodiments of the present invention includes the first contact 110 and the second contact 120, in which the first contact 110 includes the first rivet portion 111 and the first contact portion 112, and the second contact 120 includes the second rivet portion 121 and the second contact portion 122.

The first rivet portion 111 and the second rivet portion 121 may be made from a Cu material, and the first contact portion 112 and the second contact portion 122 may be made from a Ag material. That is, the first and second rivet portions 111 and 121 and the first and second contact portions 112 and 122 may be made from a non-magnetic material, such as a paramagnetic material or a diamagnetic material, which is too weakly influenced by a magnetic field to be magnetized, except for the ferromagnetic material.

However, differently from the foregoing various exemplary embodiments of the present invention, the, the electrical contact structure according to the various exemplary embodiments are not configured such that the second rivet portion 121 of the second contact 120 is magnetized and a magnetic core or an external magnetic material is provided.

Instead, a solenoid including a doughnut-shaped core 171 or 271 and coils 172 or 272 is disposed around the first contact 110 and the second contact 120 to generate magnetic force.

In the foregoing two embodiments, the doughnut-shaped core 171 or 271 is disposed to be parallel to a plane perpendicular to the vertical distance between the first contact portion 112 and the second contact portion 122. In FIGS. 18 and 19, the two coils 172 are wound on two opposite side sections of the doughnut-shaped core 171 forming a closed loop, respectively. That is, the two coils 172 are disposed such that the winding axes thereof are in parallel to each other.

Thus, a magnetic field is generated in a predetermined direction on a plane perpendicular to the vertical distance between the first contact portion 112 and the second contact portion 122, generating magnetic force on the plane in a predetermined direction perpendicular to the direction of the magnetic field. As a result, the trajectory of an arc is changed by the magnetic force.

Furthermore, in FIGS. 20 and 21, the doughnut-shaped core 271 and the coils 272 are disposed side by side in a predetermined direction to be parallel to a plane perpendicular to the vertical distance between the first contact portion 112 and the second contact portion 122. That is, the two coils 272 are disposed such that the winding axes thereof are in parallel to each other in the predetermined direction thereof.

Thus, a magnetic field is generated in a predetermined direction on a plane perpendicular to the vertical distance between the first contact portion 112 and the second contact portion 122, generating magnetic force on the plane in a predetermined direction perpendicular to the direction of the magnetic field. Consequently, the trajectory of an arc is changed by the magnetic force.

As set forth above, according to the high-durability electrical contact structure of the present invention, magnetic force may move particles driven by an arc to increase the distance of movement of the particles, consuming the energy of the arc, and may cause the position of an arrival point of the arc to be non-uniform, preventing the electrical contact from be abraded and the protrusions from being formed. In the present manner, the temperature of the electrical contact may also be significantly lowered, and thus, the problem of fusion of the contact portions due to high temperature may be prevented. Accordingly, the endurance life of the electrical contact may be increased and the performance of the electrical contact may be improved.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A high-durability electrical contact structure comprising:

a first contact and a second contact disposed to face each other while being spaced apart a predetermined distance from each other, wherein the second contact includes a magnetic material, wherein the second contact includes:

a second rivet portion forming a body of the second contact; and a second contact portion provided on an end portion of the second rivet portion to face the first contact, and wherein the magnetic material is included in the second rivet portion of the second contact, wherein a contact surface of the second contact portion is not in parallel to a contact surface of the first contact, and wherein a central axis of the first contact and a central axis of the second contact are disposed coaxially, and the contact surface of the second contact portion is inclined with respect to a surface in parallel to the contact surface of the first contact.

2. The high-durability electrical contact structure of claim 1, wherein the magnetic material of the second rivet portion includes a ferromagnetic material or a magnetized alloy including the ferromagnetic material.

3. The high-durability electrical contact structure of claim 2, wherein the second rivet portion includes a plating made from one or more selected from among Ag, Cu, Sn, and Ni.

4. The high-durability electrical contact structure of claim 1, wherein the magnetic material is a magnetic core fused inside the second rivet portion and disposed coaxially with a central axis of the second rivet portion of the second contact.

5. The high-durability electrical contact structure of claim 1, wherein the magnetic material is a magnetic core disposed in the second rivet portion to be eccentric from a central axis of the second rivet portion in an axial direction of the second rivet portion in parallel to the central axis of the second rivet portion of the second contact.

6. The high-durability electrical contact structure of claim 1, wherein the second contact further includes a top recess opening at a center portion of a top surface of the second contact portion, and the magnetic material is a magnetic core inserted into the top recess and disposed coaxially with a central axis of the second rivet portion of the second contact.

7. The high-durability electrical contact structure of claim 1, wherein the second contact further includes a bottom recess opening at a center portion of a bottom surface of the second contact portion, and the magnetic material is a magnetic core inserted into the bottom recess and disposed coaxially with a central axis of the second rivet portion of the second contact.

8. The high-durability electrical contact structure of claim 1, wherein the magnetic material is a magnetic core inserted and disposed between the second rivet portion and the second contact portion.

* * * * *